United States Patent [19]

Hardin et al.

[11] 4,313,161

[45] Jan. 26, 1982

[54] SHARED STORAGE FOR MULTIPLE PROCESSOR SYSTEMS

[75] Inventors: Dick K. Hardin; Frederic J. Puttlitz, both of Boca Raton, Fla.

[73] Assignee: International Business Machines Corporation, Armonk, N.Y.

[21] Appl. No.: 93,643

[22] Filed: Nov. 13, 1979

[51] Int. Cl.³ .................. G06F 9/38; G06F 15/16
[52] U.S. Cl. .................................................. 364/200
[58] Field of Search ........................ 364/200 MS File

[56] References Cited

U.S. PATENT DOCUMENTS

| | | | |
|---|---|---|---|
| 3,528,061 | 9/1970 | Zurcher, Jr. | 364/200 |
| 3,706,974 | 12/1972 | Patrick et al. | 364/200 |
| 3,845,474 | 10/1974 | Lange et al. | 364/200 |
| 3,919,692 | 11/1975 | Kronies et al. | 364/200 |
| 3,921,145 | 11/1975 | Emm et al. | 364/200 |
| 4,015,243 | 3/1977 | Kurpanek et al. | 364/200 |
| 4,041,461 | 8/1977 | Kratz et al. | 364/200 |
| 4,073,005 | 2/1978 | Parkin | 364/200 |
| 4,130,864 | 12/1978 | Schlotterer | 364/200 |
| 4,144,563 | 3/1979 | Heuer et al. | 364/200 |

Primary Examiner—Joseph M. Thesz
Assistant Examiner—Thomas M. Heckler
Attorney, Agent, or Firm—D. Kendall Cooper

[57] ABSTRACT

A system is provided that includes a plurality of processors connected to a shared storage via an asynchronous storage interface that includes various interface logic and a ring counter that performs polling of the processors for access to the shared storage. The ring utilizes a "lookahead" feature that bypasses stages in the ring to speed up responses to request signals from the processor. The logic uses the clock from the particular processor accessing the shared memory at any point in time.

14 Claims, 16 Drawing Figures

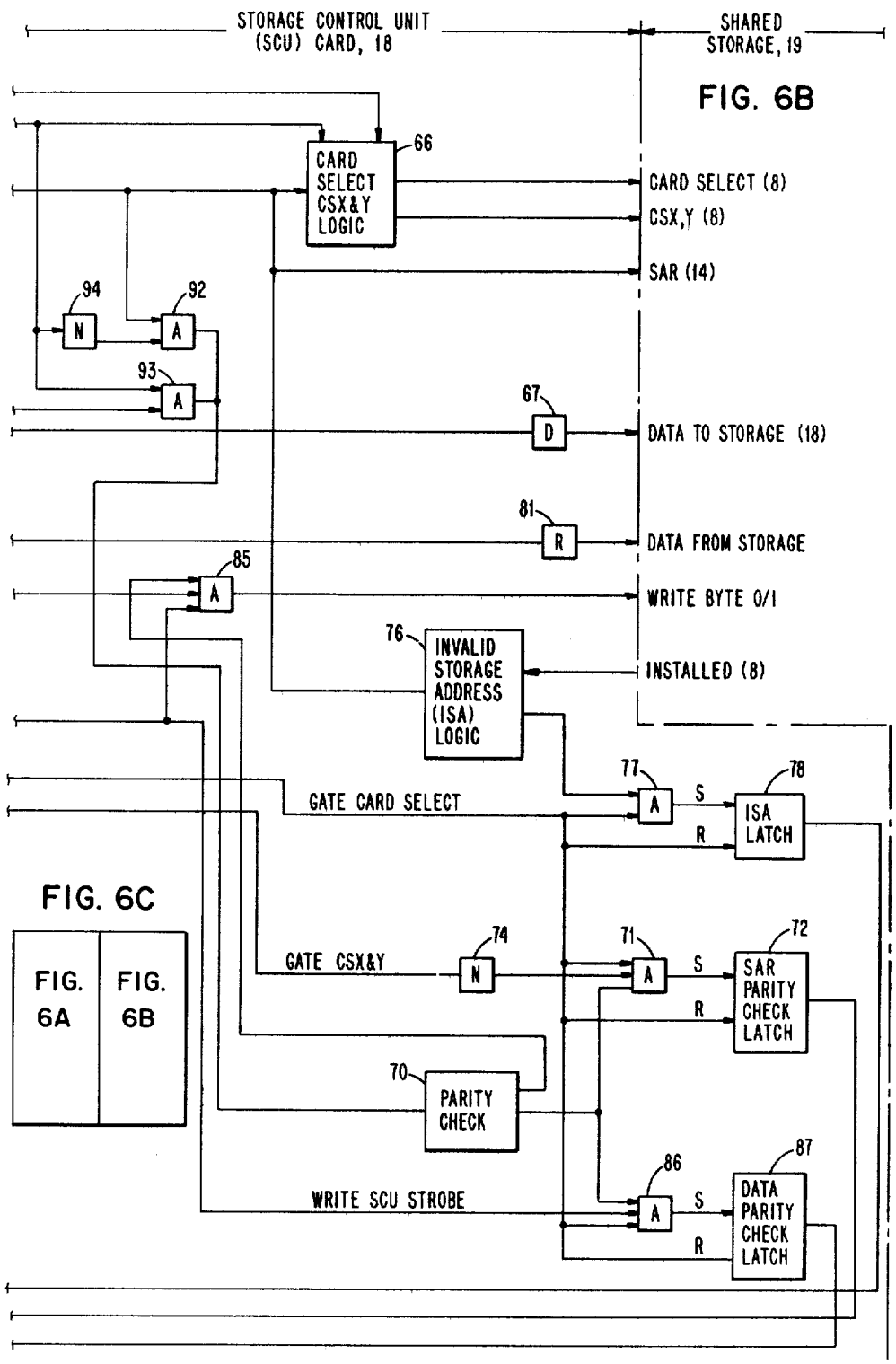

*IF STAYING WITH SAME CPU
**IF SWITCHING TO ANOTHER CPU

SHARED STORAGE FOR MULTIPLE PROCESSOR SYSTEMS

BACKGROUND OF THE INVENTION

This invention relates to multiple processing systems and, more particularly, to a shared storage arrangement for such systems.

Systems of this nature have been described heretofore wherein multiple central processing units communicate through a shared storage unit. In addition to such communication, each of the central processing units (CPU's) has its own input/output devices. Many times a single bus structure is shared by all of the units on a time-shared basis which may lead to delays in processing time. In many cases, access to the shared or common memory is on a synchronous basis only. In addition, access of the common shared storage unit may be set up on a prioritized basis. Frequently, the CPU's are provided with their own independent storage, as well. Also, it has been known to provide interface units in a multiple processing system to resolve priority among the various processors requesting service.

SUMMARY OF THE INVENTION

In accordance with the present invention, a system is provided that includes a plurality of processors connected to a shared storage unit via an asynchronous storage interface. Each processor has its own assigned storage unit separate from the shared storage. Each processor has its own memory map so that the addresses in the related dedicated main storage and the shared storage appear to be contiguous. This is accomplished by a translator associated with each processor.

The asynchronous storage interface comprises various interface logic and a high speed ring multiplexer which is used to perform polling of each of the processors for access to the shared storage.

The shared storage does not have its own clock but instead uses the clock from the particular processor accessing the shared storage at any point in time. Each processor has access to all memory locations in the shared storage.

In order to protect a data set being worked on by one processor so that this data set is not prematurely accessed by another processor, a software convention is adopted whereby a pedetermined bit in a flag field of the storage address will "lock out" other processors. To avoid conflict among the CPU's in accessing the shared storage, the invention provides a Test and Set operation, whereby processor A, as an example, would seize the shared storage for two memory cycles, accomplishing both test and set before processor B has access to the shared storage. A given processor can also access shared storage for double memory cycles. The Test and Set operation allows the selected CPU to freeze the ring.

Another feature of the invention is the provision of cycle stealing input/output devices which can access the common storage directly. These input/output devices are associated with respective ones of the several processors and communicate through the processor channel to the shared storage. When two CPU requests come in simultaneously, the next one around the ring from the last CPU serviced gets the next cycle. If there is a cycle in progress, the next CPU to be serviced is partially set up during the current service time so that the new cycle can start quickly after completion of the current cycle. The ring is based on a "lookahead" feature that bypasses stages in the ring.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 3A is a diagram of the layout of a shared storage card file useful in the systems of FIGS. 1 and 2, while

FIGS. 6A and 6B, when arranged as shown in FIG. 6C, illustrate various interface and storage control unit logic utilized in the systems of FIGS. 1 and 2.

ABBREVIATIONS

The following abbreviations are sometimes used herein:

| Abbreviation | Definition |
| --- | --- |
| CPU | Central Processing Unit |
| CSX&Y | Chip Select X & Y |
| I/O | Input/Output |
| ISA | Invalid Storage Address |
| K or KB | Kilobyte |
| NS | Nanosecond |
| OP | Operation |
| PH | Polarity Hold Latch |
| SAR | Storage Address Register |
| SCU | Storage Control Unit |
| SSTG | Shared Storage |

DESCRIPTION OF MULTIPLE PROCESSOR SYSTEM AND SHARED STORAGE FEATURE

Figure 1:
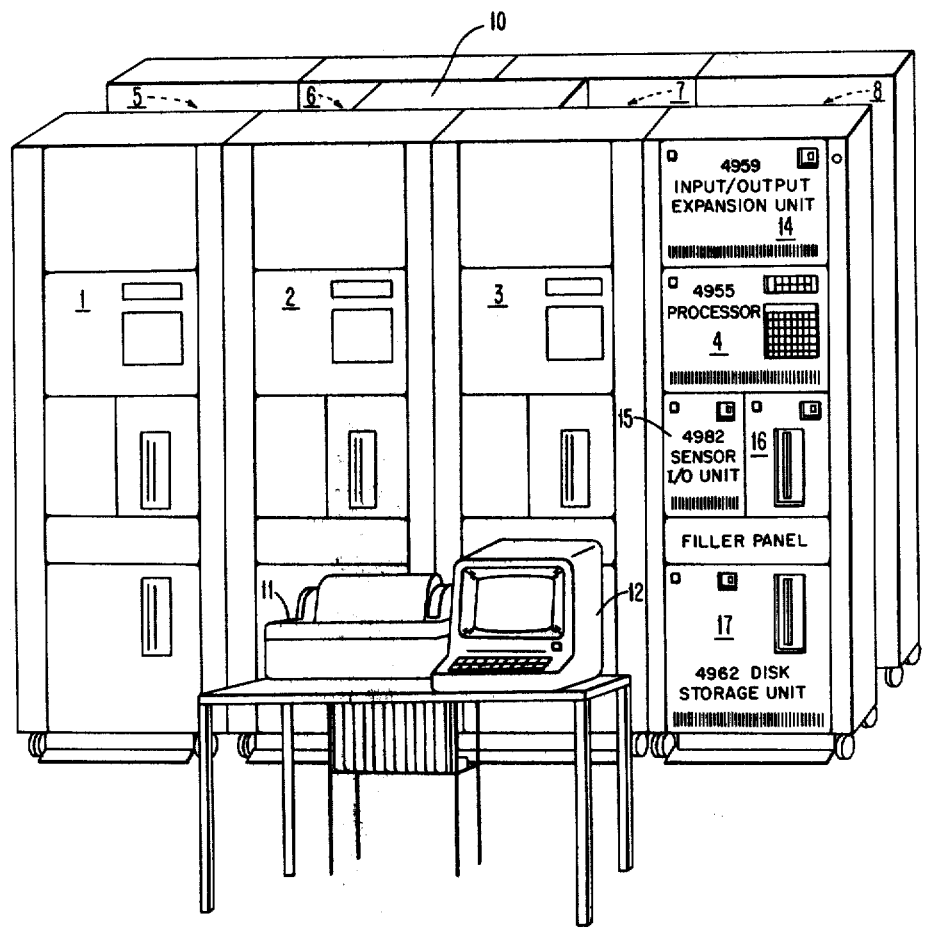
FIG. 1 is a perspective view of a multiple processing system incorporating the shared storage feature in accordance with the present invention.

FIG. 1 illustrates one arrangement of eight central processing units (CPU's) 1-8 positioned to form a letter "H" as viewed from above. The CPU's (processors) may be of the type described in the U.S. Pat. No. 4,047,161 having M. I. Davis as inventor and entitled "Task Management Apparatus". An entire line of IBM computing equipment of similar interest is described in the "Series/1 Digest", GS 360-0061, copyright 1977, 1978, International Business Machines Corporation. A processor described in that document that would serve in the system herein is the IBM 4955 Processor.
}

Four of the processors 1-4 each mounted in an 1.8 meter rack, are positioned in the front and four others 5-8 of equal size, in 1.8 meter racks, are in the rear. A frame positioned in between each set of four processors houses the Shared Storage card file 10. Typically, each 1.8 meter rack is bolted to the one next to it so that all eight racks, along with the shared storage unit, create one solid grounded frame system. The "H" configuration is just one of many different configurations that can be used. It is preferably done in this fashion to make use of flat cable internally located in the frames.

Each of the processors, such as processor 4, has a number of associated units such as the printer 11 and display station 12. In addition, the processor may have an input/output expansion unit 14, a sensor I/O unit 15, a diskette unit 16 and a disk storage unit 17.

The storage for each CPU is up to 256 KB in size. The Shared Storage Card File 10 has up to 512 KB of storage on individual circuit cards. Shared storage addresses are fixed to start at location (hexadecimal) 200000 (2 MB) to insure its address is greater than any attached future CPU. The storage in the Shared Storage card file is accessible to all attached CPU's. The attached CPU's have no means of direct communication with each other, but communicate only through the shared storage unit 10. However, Program Interrupt/Digital Output (PI/DO) or other communications features may be connected between CPU's for interrupt capability.

Figure 2:
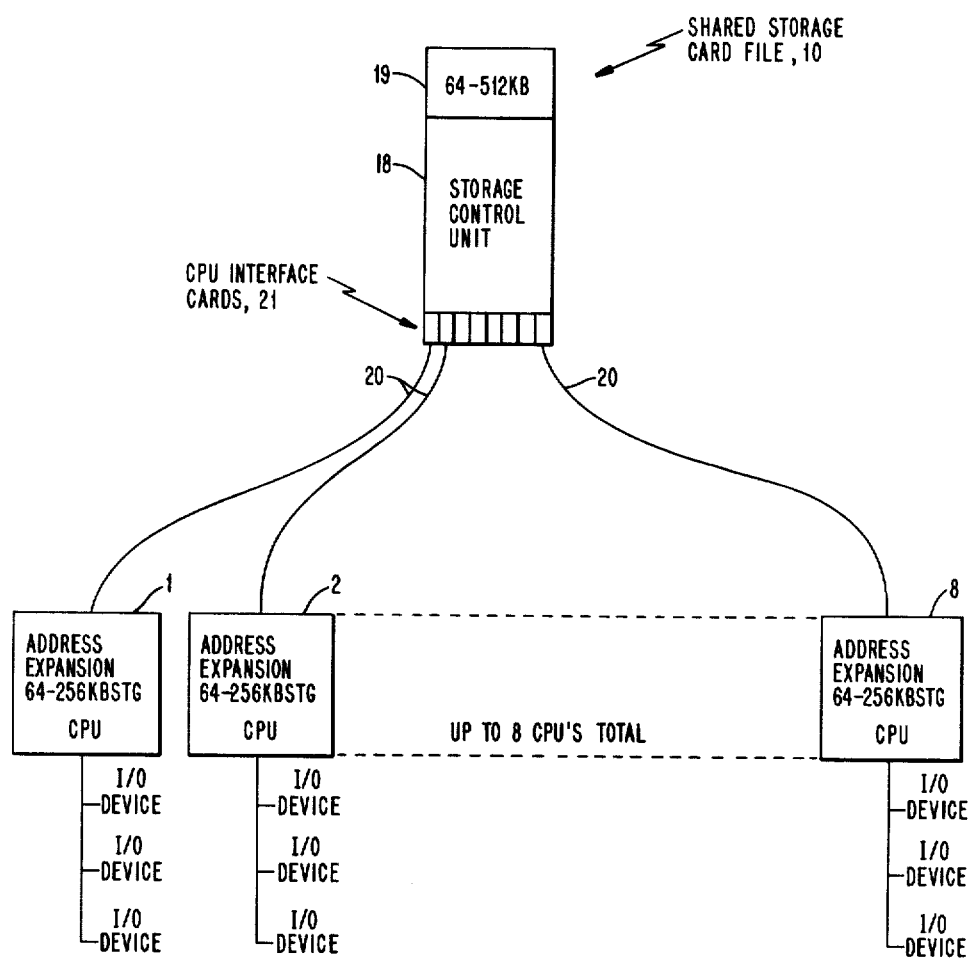
FIG. 2 is a block diagram of a multiple processing system comparable to that illustrated in FIG. 1.

Referring to FIG. 2, the multiple processor system of FIG. 1 is illustrated in a more diagramatic form. It includes the CPU's 1-8, the Shared Storage card file 10, and a number of interconnecting cables 20 enabling transmission of control, address and data information between the CPU's 1-8 and Shared Storage card file 10 by way of interface cards 21.

Each CPU is attached to the Shared Storage Card file via two flat cables from top card connectors on the CPU Address Expansion card cables to top card connectors on its CPU Interface card. Thus, a set of wires is dedicated to each CPU so that the request and storage address for the next CPU to be serviced can be sitting on the cables into the Shared Storage card file ready to be serviced immediately upon completion of the last CPU service without delay. The length of these cables is typically between 6 and 20 feet.

Figure 3A:
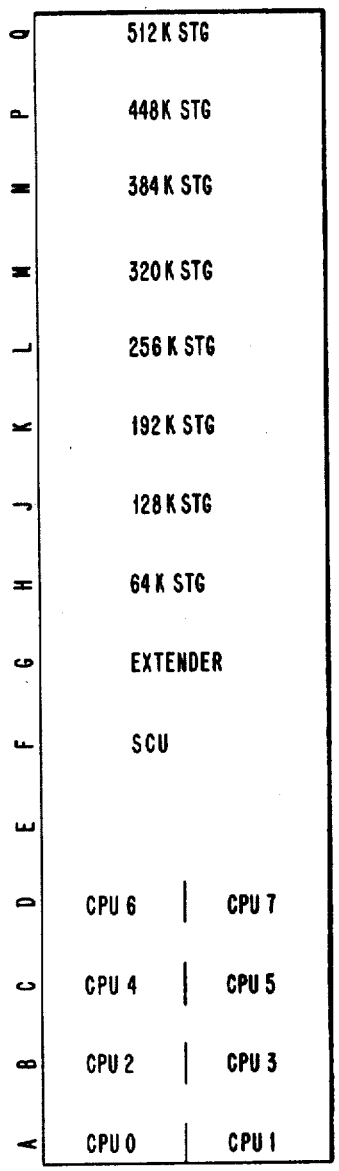
Figure 3B:
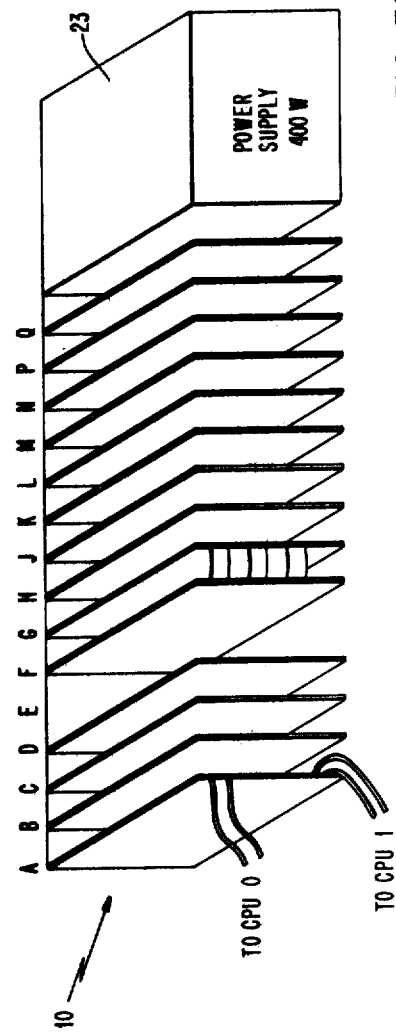
FIG. 3B is a pictorial representation of such card file.

Typical error conditions reported by the Shared Storage are Invalid Storage Address, Write Data Parity Check, and Storage Address Parity Check. The Shared Storage card file is typically packaged in a care file, FIGS. 3A and 3B, containing a number of card sockets such as card sockets A-Q and a power supply 23. This card file contains up to four CPU interface cards (A-D), a Storage Control Unit (SCU) card (F) and an associated extender card (G) to provide a path for signals from the top of the SCU card to the card file board, and up to eight 64K byte storage cards (H-Q). Each of the interface cards (A-D) handles attachment of two of the processors.

CPU/SHARED STORAGE INTERFACE LINES

Figure 4:
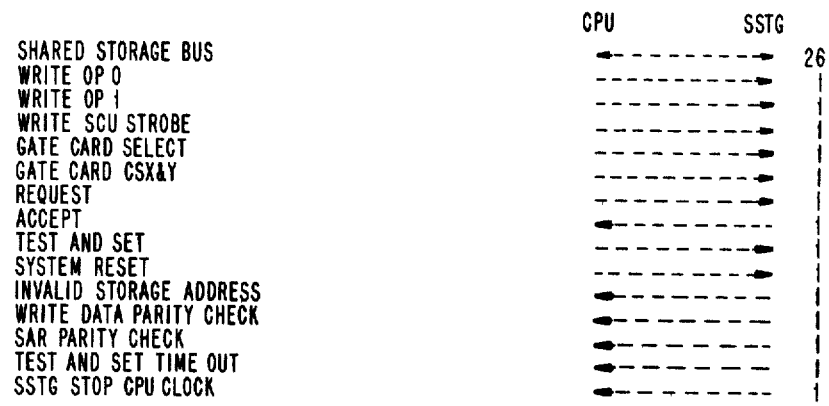
FIG. 4 illustrates the interface lines between the Central Processing Units (CPU's) and the shared storage.

The CPU/Shared Storage Interface for each attached CPU consists of forty lines as shown in FIG. 4. These lines are defined below. These lines are shown in FIG. 4. All lines are minus active. The Shared Storage Bus is a bidirectional dual purpose 26-bit bus (bits 0-22, P0, P1, and P2). The bus is used for both the transfer of the storage address and the transfer of data between the attached CPU's and the Shared Storage.

Bits 0-22, P0, P1, and P2 are used to transfer the Shared Storage Address from the CPU to the Shared Storage card file. The Storage Address bits are valid from the rise of the Request line to rise of the Gate CSX&Y line. The Storage Address bits and their usage are shown below.

| Bit | Usage |
|---|---|
| 0, 1, 3, 4 | Must be 0 |
| 2 | Must be 1 (2MB Address) |
| 5-8 | Card Select |
| 9, 10 | CSY |
| 11, 12 | CSX |
| 13-22 | Word Select |

Bits 0-15, P0, and P1 are used for Data Transfer between the CPU and Shared Storage.

Request.

The Request line is raised by the CPU requesting either a Read or Write to Shared Storage.

Accept.

This tag is raised by the Shared Storage in response to a Request when use of Shared Storage is available to the requesting CPU. If Accept is not raised within a certain time of the rise of request, a "time out" will occur in the Address Expansion card of the requesting CPU. This line remains active until the fall of the Request line.

Write (Storage Control Unit (SCU) Strobe.

This is a timed tag raised by the CPU on a Write Cycle. It is raised after the rise of Gate Card select.

Write OP 0/Write OP 1.

One or both of these lines are raised by the CPU on a Write Cycle to store byte 0 and/or byte 1 in the addressed Shared Storage location. These are valid from the rise of Gate Card Select to the Fall of Gate CSX&Y.

Gate Card Select.

This is a timed line which is raised by the CPU at the first Time A after Accept is received from Shared Storage by the CPU. It is used by the Shared Storage Card File to gate the Card Select lines to the Shared Storage cards.

Gate CSX&Y.

This line is raised by the CPU after Gate Card Select. It is used to gate the CSX and CSY lines to the Shared Storage Cards.

Test and Set.

This is a line raised from the CPU during the Test Bit and Set (TBTS) instruction. It can be used for controlled sharing of a shared storage area by more than one program. To accomplish this, some bit must be designated as the control bit. The desired interlock can be achieved by establishing a program convention in which a zero bit indicates that the shared area is available but a one bit means that the area is being used. Each using program then must examine this bit by means of TBTS instruction before making access to the common area. If the test sets the zero indicator, the area is available for use; if it resets the zero indicator, the area cannot be used. With the Test and Set line active no other CPU can access the test bit between the moment of fetching (for testing) and the moment of storing the bit (setting). Hence, the possibility is eliminated of a second CPU testing the bit before the first CPU is able to set it.

Other instructions which may be used but which require inversion of the logic, i.e., Test and Reset logic, are Move Byte and Zero, Move Word and Zero, Test Bit and Invert, and Test Bit and Reset.

Invalid Storage Address.

Invalid storage address is a tag raised by the Shared Storage to indicate that a CPU has attempted to access an address outside of the installed Shared Storage. When raised, this line stays active until the fall of Gate Card Select.

SAR Parity Check.

This line is raised by Shared Storage to indicate bad parity has been detected in one or more of the three bytes of the Shared Storage Address. This may or may not result in an ISA, but in no case will Shared Storage be accessed. When a SAR parity check is detected this line will be raised by Accept and will remain active until the fall of the Gate Card Select.

Write Data Parity Check.

This tag is raised by the Shared Storage to indicate that bad data parity has been detected by Shared Storage on a Write Cycle. Storage will not be accessed and the line will be active at the time that Write SCU Strobe is active.

System Reset.

This reset line from the attached CPU is used only to degate the lines from that CPU's CPU Interface card to the SCU card in the Shared Storage Card File.

Test and Set Time Out.

This line is pulsed by Shared Storage when a CPU has held its Test and Set time up for more than a predetermined amount of time. It sets a latch in Shared Storage which blocks all inputs from that CPU until that CPU does a Power On Reset. It also causes a Storage Parity Check in the offending CPU.

SSTG Stop CPU CLOCK.

This line is not used for the 64KB storage cards. In future Shared Storage units, it will be brought active for the duration of time the CPU clock is to be stopped for refresh on a dynamic storage or possibly for a slower denser storage.

CPU Interface Card/SCU Card Interface Lines

This interface consists of 40 lines, not illustrated. However, these lines are essentially the same as those described in connection with FIG. 4 with the following exceptions:

System Reset.

System Reset from the CPU is used only on the CPU Interface card and is not passed on to the SCU card.

Accept Holdover.

This line is raised by Accept and remains active until the fall of Gate Card Select. This line is inactive during System Reset. All lines from the CPU interface card to the SCU card, except Request and Test and Set, are gated by Accept Holdover. The lines are gated on the CPU Interface card. The lines between the four CPU Interface cards and the SCU card, except Request and Accept, are dotted by board wiring. One Request line and one Accept line is required for each CPU.

SCU/Storage Card Interface

Figure 5:
FIG. 5 illustrates the interface lines between the storage control unit and the storage card.

This interface consists of 80 lines. These lines are shown in FIG. 5

Card Select (2 per storage card)—Unary Card Select for each 32K bytes of Shared Storage.

CSX, CSY—Signals for further array selection of the Shared Storage. These signals are received by each Shared Storage card.

Storage Address Register (SAR)—The low order 10 bits of the SAR addresses 2048 storage word locations.

Each Shared Storage card receives the 10 low order SAR bits.

Installed—A unary line installed for each of the eight Shared Storage cards. The installed signals are used for detection of physical Invalid Storage Address (ISA) on a Shared Storage cycle.

Data Bus To Storage—16 data lines plus 2 byte parity lines driving from the SCU (Storage Control Unit) to the Shared Storage.

Data Bus From Storage—16 data lines plus 2 byte parity lines driving from the Shared Storage to the SCU.

Write Byte 0, Write Byte 1—Two byte strobes which are received by each Shared Storage card.

DETAILED DESCRIPTION OF SHARED STORAGE FEATURE AND ITS OPERATION

CPU Interface Card

Figure 6A:
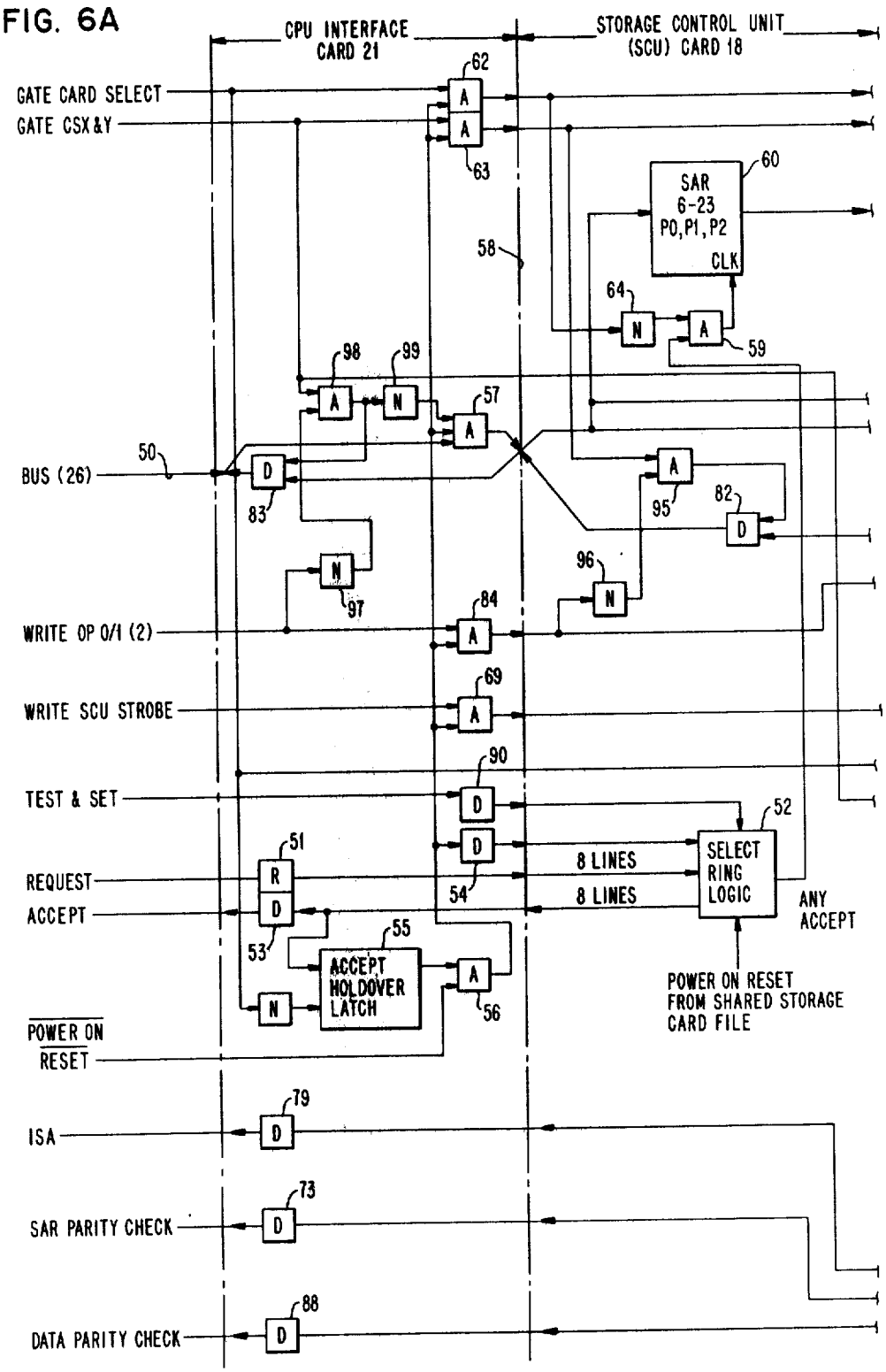

A typical CPU Interface Card 21, FIGS. 2 and 6A, has connectors for the two cables which carry the signals for communication with the Address Expansion card of the attached CPU. One CPU Interface card has four connectors so is can accommodate up to two CPU's.

The CPU Interface card contains logic for the 26-bit Shared Storage Bus, gating logic for signal lines from the CPU Interface card to the Storage Control Unit (SCU) card, and drivers and receivers for the CPU/Shared Storage Interface.

Storage Control Unit (SCU) Card

The Storage Control Unit (SCU) card, FIGS. 2, 6A and 6B, has connectors for the three flat cables to the Extender Card.

The SCU card, FIGS. 6A and 6B, contains:
Storage Address Register (SAR) 60
Shared Storage Address Logic 66 (Card Select CSX&Y Logic)
CPU Select Ring Logic 52
Error Detection Logic (Parity Check 70)
Invalid Storage Address Logic (ISA) 76
SCU/Storage Card Interface Drivers (D) and Receivers (R)
Storage Address Register 60.

This is a 26-Bit Register (Bits 0-22, P0, P1, and P2) for storing the Shared Storage Address to be accessed. The address bits are set in the register at the rise of Accept.

Shared Storage Address Logic 66.

Storage Address Register bits 0 through 22 are used to address Shared Storage. Use of these bits are as follows:

| Bits | Usage |
|------|-------|
| 0, 1, 3, 4 | Must be 0 |
| 2 | Must be 1 (2MB Address) |
| 5–8 | Decoded into 16 card select lines gated by Gate Card Select (Each card has two selects) |
| 9, 10 | Decoded into four CSY lines gated by Gate CSX&Y |
| 11, 12 | Decoded into four CSX lines gated by Gate CSX&Y |
| 13–22 | Used for Word Select on the Storage cards |

CPU Select Ring Logic 52.

The CPU Select Ring Logic 52 selects the CPU that will receive the next Shared Storage cycle. This ring is not advanced sequentially. Selection of the CPU to receive the next cycle is based only on the last CPU serviced or currently being serviced. If two CPU's raise their request lines simultaneously, the next CPU around the ring from the CPU being serviced will be given the next cycle. If there is a cycle in progress, the next CPU to be serviced is partially set up during the current service time so that the next cycle starts shortly completion of the current cycle.

Test and set allows the selected CPU to freeze the ring so that it does not advance to another CPU.

Error Detection Logic (Parity Check 70).

The Shared Storage Bus is checked for odd parity by Parity Check block 70, FIG. 6A, for both Storage Address and Data during a Write cycle and for Storage Address during a Read cycle. If bad parity is detected, the Write byte 0 and Write byte 1 lines to the storage cards are degated.

If Test and Set is held up from one CPU for greater than a predetermined amount of time then a Storage Parity Check is set in that CPU and requests from that CPU are blocked until Test and Set drops.

Invalid Storage Address (ISA) Logic 76

The Storage Address is checked to determine if it is within the domain of installed storage. If it is not, an Invalid Storage Address signal is generated.

Operation of Shared Storage Interface and Storage Control Unit (SCU)

Figure 7:
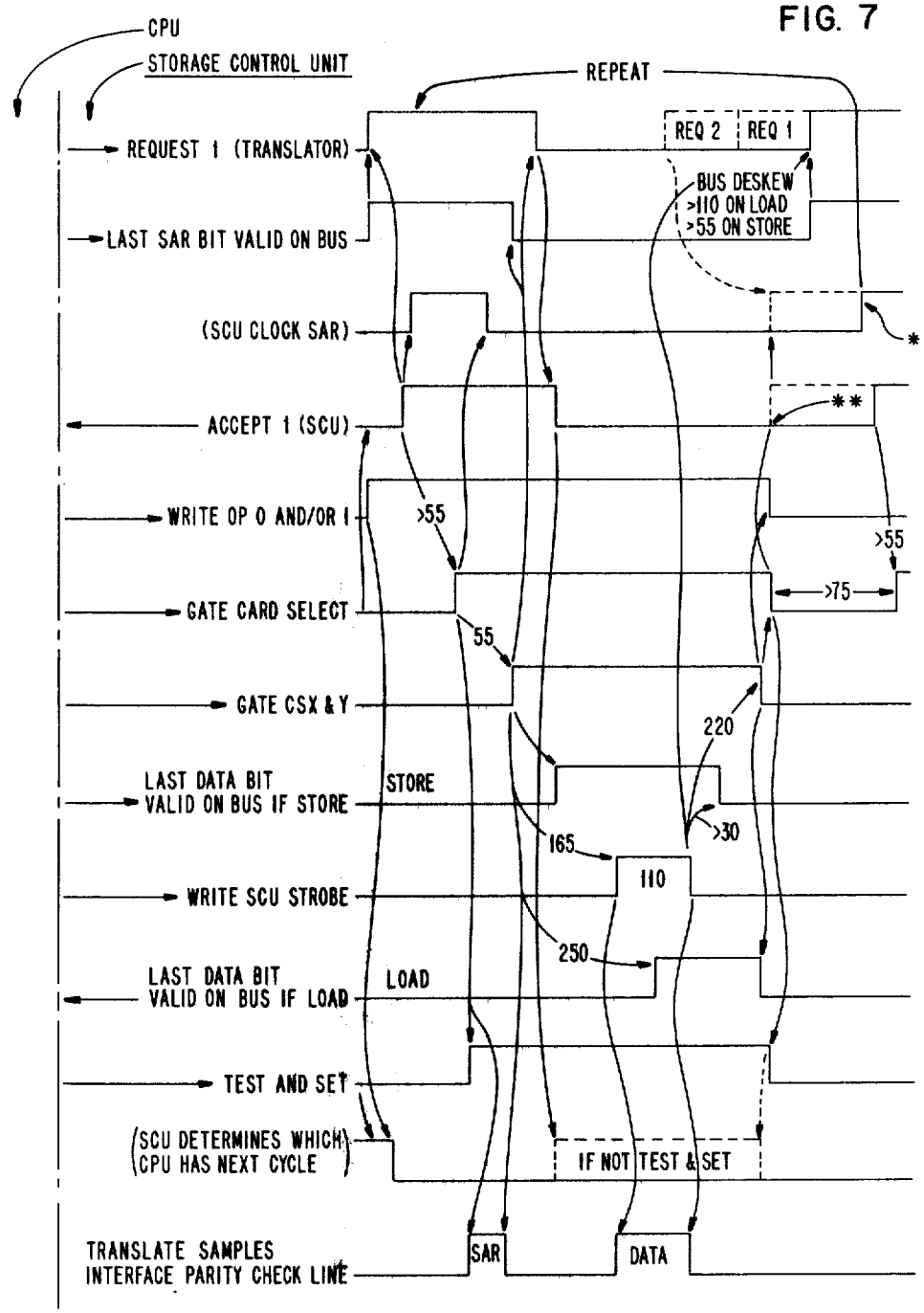
FIG. 7 is a timing diagram for the CPU/Shared Storage Interface.

Reference is made to the block diagram of FIGS. 6A and 6B and the timing chart of FIG. 7. The first action of interest is when the last Storage Address Register bit becomes valid on bus 50. Immediately following, a Request from the CPU handled by this portion of the interface card 21 becomes active. This Request signal feeds receiver 51, FIG. 6A, which in turn is directed to the Select Ring logic 52. Select Ring logic 52 determines which CPU has access to Shared Storage and sends an Accept signal through Driver block 53 to the appropriate interface card and back to the requesting processor. The Accept signal also sets the Accept Flip Latch Hold Over 55. The Accept Latch Hold Over output goes to AND circuit 56 which gates bus 50 through a set of AND circuits generally represented by 57 to a dot represented by line 58. The data feeds through the dot onto the Storage Control Unit card 18 and into the Storage Address Register 60. The signal "Any Accept" which is the logical OR of the eight Accept signals within Select Ring logic 52 is gated at AND circuit 59 by Gate Card Select Not by way of AND circuit 62 and AND Invert circuit 64, FIG. 6A. The output pulse from AND circuit 59, which is approximately 55 nanoseconds, sets the data on bus 50 into the Storage Address register 60. When Gate Card Select does become active, it is gated by Invalid Storage Address logic 76 by AND circuit 77 in FIG. 6B. ISA latch 78 will be set if ISA logic 76 determines that an Invalid Storage Address has been selected. The output of the ISA latch 78 is sent to the requesting processor through driver 79, FIG. 6A.

Signal Gate CSX&Y from AND circuit 63, FIG. 6A, is kept orthogonal into AND circuits 92 and 93, FIG. 6B, by block 94. When Gate CSX&Y is inactive the parity check block 70, FIG. 6B, checks the Storage Address Register 60 for odd byte parity. When Gate Card Select becomes active, the parity check block 70 gates AND circuit 71, FIG. 6B, and sets the SAR parity latch 72 if the SAR address register's parity was incorrect. The output from the SAR parity latch is sent to the requesting processor through driver 73, FIG. 6A. When signal GATE CSX&Y becomes active, AND circuit 92 is disabled by way of AND Invert circuit 94 and AND circuit 93 is enabled. Data on bus 50 can now be gated to the parity check block 70. The result of the parity check of data is recorded into data parity latch 87, FIG. 6B, if Write SCU strobe makes AND circuit 86 which will occur during a Write operation to Shared Storage. The output from data parity check latch 87 is sent to the requesting processor through driver 88.

The Card Select and CSX&Y logic within Card Select block 66, FIG. 6B, generate sixteen (16) unique card select lines, four (4) common CSX lines and four (4) common CSY lines. These signals are generated from the decoding of the Storage Address Register bits and are timed by Gate Card Select and Gate CSX&Y.

AND Invert block 97, AND circuit 98 and AND invert block 99, FIG. 6A, are used to control the direction in which bus 50 is carrying data. During a Shared Storage Read or Write operation, AND circuit 98 and Driver 83 are degated when Gate CSX&Y is inactive. This allows Bus 50, which is carrying the Shared Storage Address to be gated through AND circuit 57 and hence to the Storage Address Register 60. When Gate CSX&Y becomes active and the Shared Storage operation is a Write operation to storage, that is, Write SCU Strobe is active from AND circuit 69, AND circuit 98 and Driver 83 are still blocked and bus 50 continues to be gated through AND circuit 57. Data will pass through the SCU card 18 by way of driver 67, FIG. 6B. If Gate CSX&Y became active and the shared storage operation was a Read from storage, that is, Write SCU strobe is not generated, then the output from inverter 97 would be at a logical 1 and thus gate AND circuit 98. This in turn degates AND circuit 57 and enables driver 83. After the appropriate storage access time, data from storage enters the SCU via receiver 81, FIG. 6B, and leaves via driver 82, FIG. 6A. The dot bus 58 accepts the output from conditioned SCU driver 82 and allows interface card 21 to redrive the storage data through driver 83 to bus 50.

AND circuits 84 and 85 serve a Write strobing function.

Back in the accepted processor, Gate CSX&Y also removes the Request line to block 51, FIG. 6A, which then removes it from the Select Ring logic 52. This causes Select Ring logic 52 to drop the Accept line.

AND circuit 95 allows data to come from storage through Driver 82 after Gate CSX&Y becomes active. The fact that it is a Read operation rather than a Write operation is indicated by Inverter 96. If the Shared Storage Request is a Write operation, the Write Op 0/1 lines will become active at the beginning of the request as shown in the timing chart, FIG. 7, and remain active until the Shared Storage Write cycle is completed.

Another item of interest in the timing chart, FIG. 7, is the Test and Set Pulse. This signal was described earlier and is used to block the Select Ring logic 52 from advancing to the next processor between the Fetch and the Store of the Test and Set operation. The Test and Set signal becomes active soon after the rise of the Gate Card Select associated with the fetch portion of the operation by way of Receiver circuit 90 and remains active until the fall of Gate Card Select associated with the store portion of the operation.

Select Ring Logic and Timing

Some multiple processor systems operate with delays because the select ring advances at the rate of an internal clock. If a request from a CPU just missed being selected, it would have to wait while the Select ring proceeded clear around the ring before it could be serviced.

The scheme described herein is much faster and does not require an internal clock. A prior scheme of interest is described in the U.S. Pat. No. 3,706,974 having Robert L. Patrick et al as inventors and entitled "Interface Multiplexer". A number of significant modifications have been made. The devices are changed to CPU's, the Control Unit is eliminated, and the priority lines are eliminated. CPU lookahead and Test and Set are added.

When two CPU requests come in simultaneously, the next one around the ring from the last CPU serviced gets the next cycle. If there is a cycle in progress, the next CPU to be serviced is partially set up during the current service time, so that the next cycle can start shortly after completion of the current cycle.

The Select Ring 52 herein uses CPU lookahead. This contrasts with the scheme described in U.S. Pat. No. 3,706,974 which required the GO line to propagate clear around the ring before service could be granted. The CPU lookahead bypasses stages in the ring and speeds up response time.

The Test and Set addition allows the selected CPU to freeze the ring so it does not advance to another CPU.

FIG. 7 shows the Select Ring interface timings and FIGS. 8A-8D show one bit of the Select Ring logic with certain ring logic common to all processors.

Select Ring logic 52 is shown in considerable detail in FIGS. 8A-8D which include the logic necessary to implement one processor selection for the Select Ring as well as certain common logic that is provided for handling up to eight processors, comprising a set of a predetermined number of processors. The logic diagram in FIGS. 8A-8D is a first-level diagram and accordingly various circuit blocks are organized by dashed blocks to indicate their functions. An example of this is the Master Request latch 102, FIG. 8B.

Figure 8A:
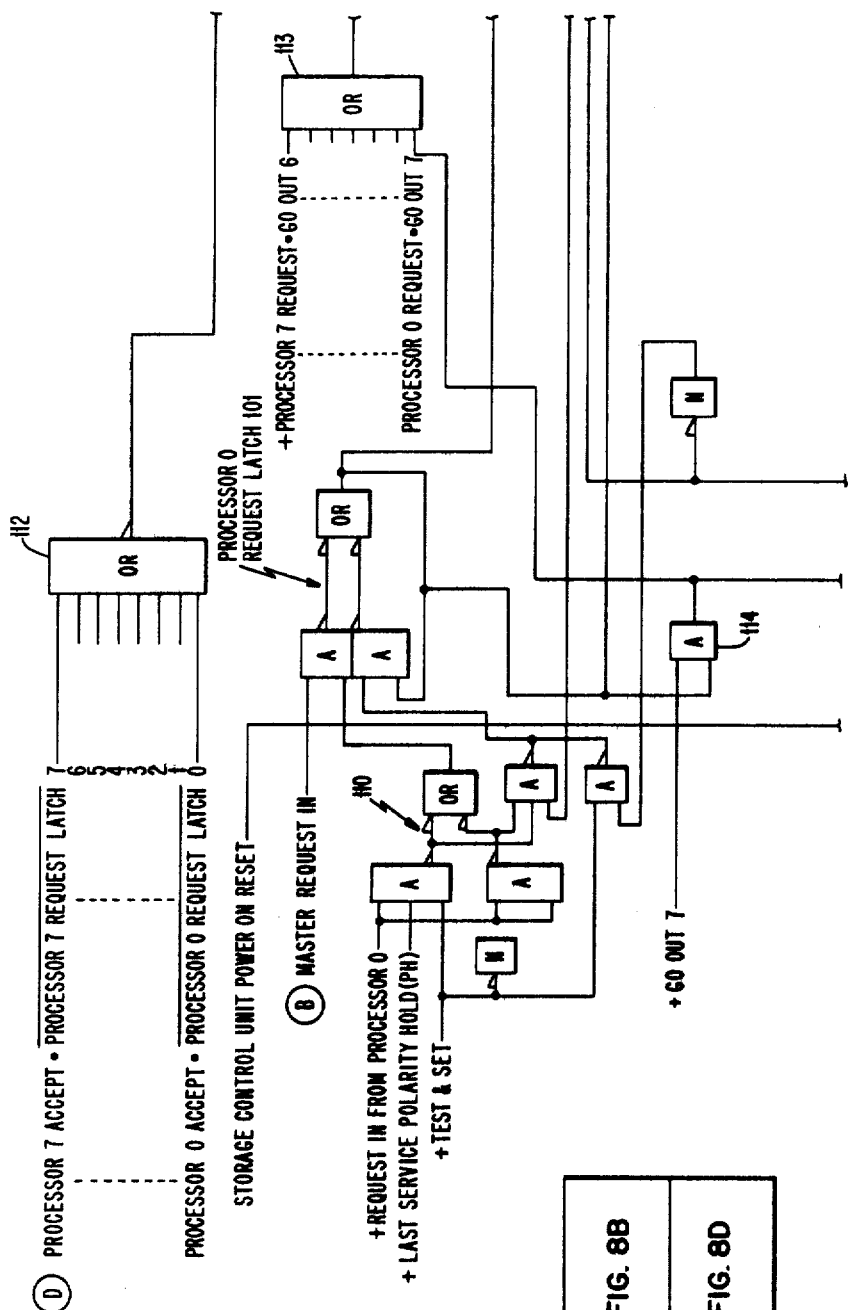
FIGS. 8A-8D, when arranged as shown in FIG. 8E, illustrate a Select Ring and associated logic useful in handling requests for the storage shared by the CPU's.
Figure 8B:
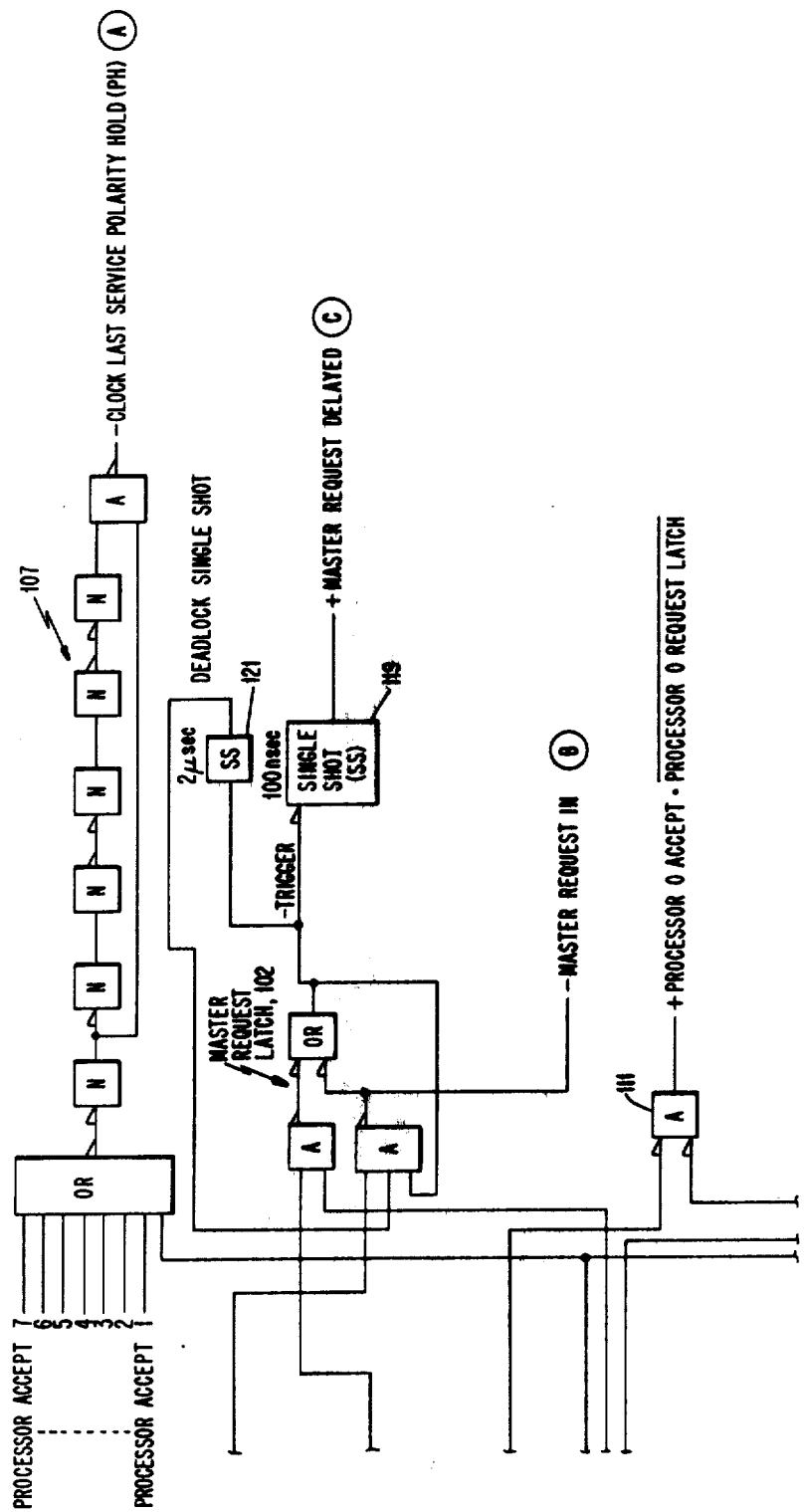
Figure 8C:
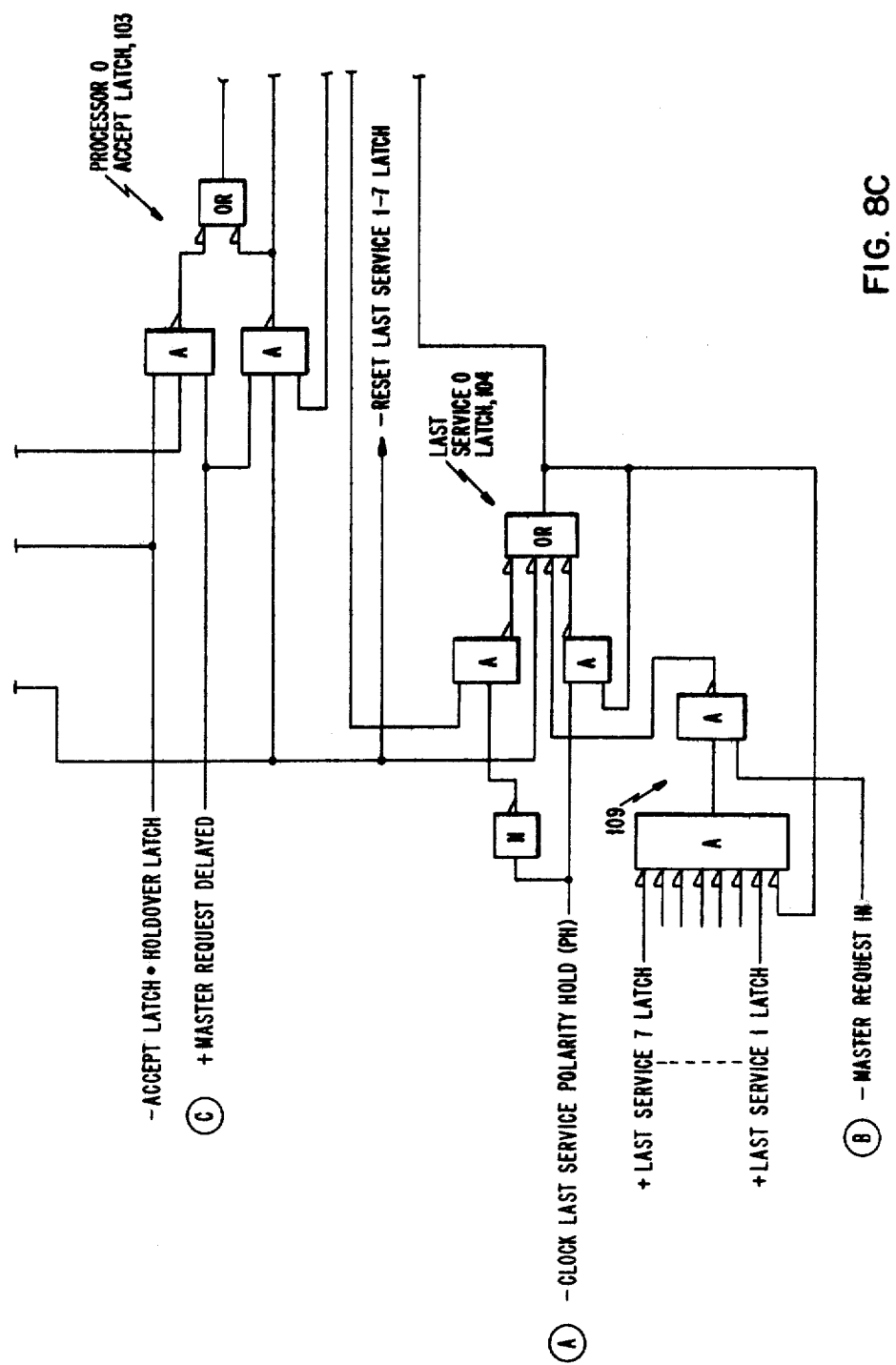

The start of the Select Ring operation is with inputs to the Processor 0 Request Input Gates 110, FIG. 8A. The input signal lines to block 110 are Request In from processor 0, (also referred to as Request Block 51 in FIG. 6A), Last Service Polarity Hold 0 (PH) and Test and Set. Another condition is Test and Set Not and Request In from processor 0 stored by Processor 0 Request Latch 101 by way of Input Gates 110. This logic insures that the proper CPU Shared Storage Request is processed if Test and Set is active.

As soon as a Request signal from Processor 0 is latched up in Processor 0 Request latch 101, it follows a path from this latch to the AND circuit 114 which has, as another input, Go Out 7. Each processor on the Select Ring has its own Go Out signal. The function of this signal will be discussed further on in the operation of the Select Ring.

The output from AND circuit 114 among other places is directed to the Master Request Set Gate 113. The Master Request Set Gate is an OR circuit in each of the eight blocks corresponding to block 114 in the Select Ring. Each processor in the Select Ring has a block 114 in the Select Ring Logic. The output of Block 113 in turn goes to the Master Request latch 102, FIG. 8B. The Master Request Latch 102 will set if Accept Hold-over latch driver 54 in FIG. 6A and the output of block 113, FIG. 8A, are active.

The output of Master Request Latch 102 is directed to a continuously triggered Single Shot Block 119 which is deconditioned 100 nanoseconds (ns) after the Master Request latch 102 is set. The output of the Single Shot 119 is referred to as Master Request Delay and is one input into the Processor 0 Accept latch 103. The 100 ns delay is necessary to allow all of the Lookahead ring circuitry, such as block 105, FIG. 8D, to settle out. This is the period of time during which the Lookahead ring circuitry, such as circuitry 105, decides which processor will have its request accepted.

The Lookahead ring circuitry, such as circuitry 105, is duplicated for every processor and provides lookahead for a subset of four (4) processors in the system described. Thus, the longest logic path required to process a request by the Lookahead ring circuitry involves four stages of delay. A lookahead ring accommodating four processors is chosen as the optimum ring due to technology considerations. Obviously, a lookahead ring accommodating eight (8) processors provides the fastest ring settle out time.

Processor 0 is at the head of the ring, then processor 7 is the last processor in a counter-clockwise direction. In fielding a processor shared storage request, if Processor 2 was the last one to be serviced, the ring would prioritize requests from Processor 8, then Processor 4, Processor 5, etc., in that order. In actuality because of the lookahead operation in the system described, all eight processors around the ring from the last processor serviced can be scanned and serviced in the same amount of time as it would take to scan only two processors in a ring without lookahead.

Lookahead ring 105 includes a five-way AND/OR circuit arrangement which receives various inputs from the Ring circuits in FIG. 8. The Lookahead Ring logic for four processors is implemented for each processor on the ring according to the following Boolean equation.

Go Out N = Last Service N

Or (Last Service N-1 and Processor N Request Latch Not and Processor N Accept Latch Not)

Or (Last Service N-2 and Processor N Request Latch Not and Processor Accept Latch Not and Processor N-1 Request Latch Not and Processor N-1 Accept Latch Not)

Or (Last Service N-3 and Processor N Request Latch Not and Processor N Accept Latch Not and Processor N-1 Request Latch Not and Processor N-1 Accept Latch Not and Processor N-2 Request Latch Not and Processor N-2 Accept Latch Not)

Or (Go Out N-4 and Processor N Request Latch Not and Processor N Accept Latch Not and Processor N-1 Request Latch Not and Processor N-1 Accept Latch Not and Processor N-2 Request Latch Not and Processor N-2 Accept Latch Not and Processor N-3 Request Latch Not and Processor N-3 Accept Latch Not)

Figure 8D:
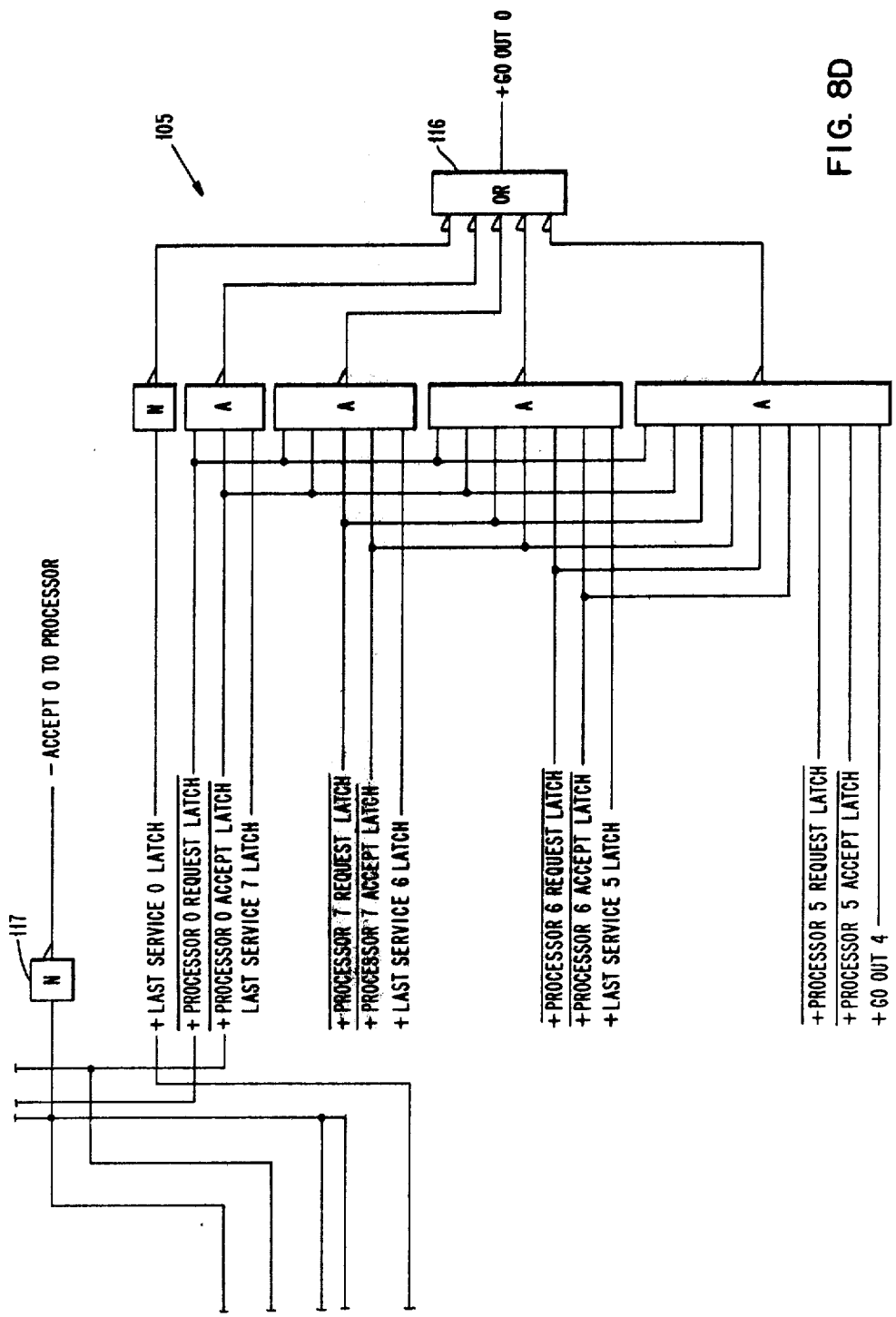

When a Processor Request Latch is set, the ring begins to collapse or decondition, automatically determining the request to be processed, even if two or more Processor Request Latches are set simultaneously. In this case, output from ring 105 by way of OR block 16 is referred to as "Go Out 0". Every processor has its own "Go Out" logic as shown in FIG. 8D.

Another input into Processor Accept latch block 103 on the Set side is the Accept Latch Holdover Not which is derived from block 54, FIG. 6A. When all of the inputs are conditioned, block 103 will set and its output is then directed to several places. First of all, it is supplied to the NAND Block 117 which returns to Driver 53 in FIG. 6A. This provides an "Accept 0" signal. Another use of the output from Processor 0 Accept latch 103 is to the last Service clocking circuitry 107, FIG. 8B. The purpose of this circuitry is to produce a glitch pulse of predictable width. A signal at the input of circuit 107 proceeds through a number of inverter stages which determine the width of the pulse. Ultimately, the original signal is ANDed together with the derived pulse from the Inverter circuits to make up the particular pulse required from the output of Circuit 107. Another circuit which receives the output from Processor 0 Accept latch 103 is the Last Service 0 latch block 104. Each Select Ring processor has a "Last Service" latch which gets set when its corresponding Processor's Request has been accepted by the Ring logic.

There is also a Last Service Generator 109 unique to Last Service 0 latch 104. This circuit provides for two things. It selects Last Service 0 latch at cold start time and if Last Service latch is not set on any processor connected to the Select Ring this circuitry sets Last Service 0 latch. The Last Service signals are essential for correct Select Ring operation.

Block 112 comprises a Master Request Reset Gate from which AND circuit 111 provides an input for Processor 0. Block 112 merely resets the Master Request latch 102 at the appropriate time.

Single Shot Block 121 provides a 2 microsecond Time Out after the Master Request Latch 102 is set. The output of block 121 feeds the reset side of the Master Request Latch. The operation of the single shot keeps the ring from deadlocking due to component failure or noise filtering into the Select Ring Logic.

Block 120 insures that the shared storage stays with the processor which issued the Test and Set command. Also, it allows Processor 0 Request Latch 101 to reset at the correct time within the shared storage cycle.

Figure 9:
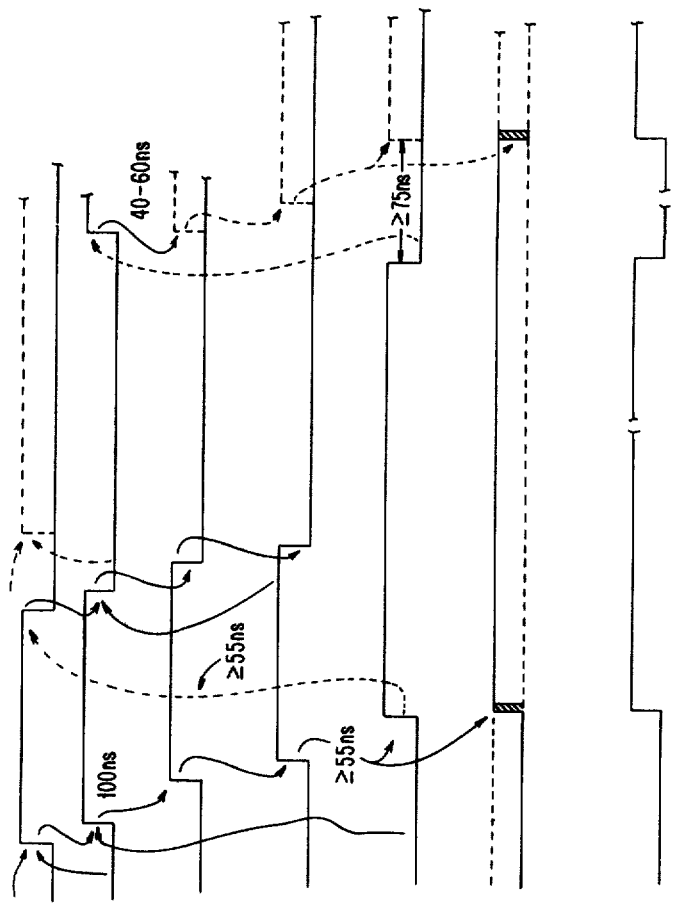
FIG. 9 is a timing diagram for the Select Ring and logic of FIGS. 8A-8D.

Referring also to the timing diagram of FIG. 9, the sequence is as follows. The signals are shown for Processor 0 but apply to any of the other processors 1-7 which may be referred to as processor N. The numbers 101, 102, etc. refer to the circuit blocks in FIGS. 8A and 8B. The Processor Request 0 involving block 101 is received by the Ring Logic, previously described. That, and the fact that the Master Request latch 102 is not active, is enough to set the request. With some logic delay time, the Master Request latch 102 is then set. The Single Shot 119 provides for 100 nanoseconds delay which is referred to as Master Request Latch Delayed. Within a certain amount of logic delay, according to the technology, the Accept 0 latch 103, FIG. 8, is set. Also see driver 53, FIG. 6A. Approximately 55 nanoseconds later, an Accept Latch Holdover signal from block 54, FIG. 6A, comes into the Select Ring logic, FIGS. 8A-8D, and degates Master Request latch 102, FIG. 8B, and Processor 0 Accept latch 103, FIG. 8C. Approximately 55 nanoseconds after the rise of Accept Latch Holdover (see dotted line on FIG. 9), the requesting processor will drop its request and in turn the Select Ring logic Processor 0 Request Latch 101 will also reset. When the Request latch 101 falls, the Master Request latch 102 is also reset. This, in turn, resets Processor 0 accept latch 103. At this point, the Select Ring logic has essentially done its function and is waiting for the Accept Latch Holdover 54 to drop. Once that drops, another processor or shared storage request can be filled, and the process and the timing starts all over.

The Last Service 0 latch 104 is set as a function of Processor 0 Accept latch 103 and will remain set until another processor shared storage request has been filled.

The Test and Set signal which comes from AND circuit 90 in FIG. 6A gates the input to Processor 0 Request Input block 110, FIG. 8A. This line, when it is active, allows only that processor which had its Last Service latch set to fill a new request from the processor. This will continue until this particular line drops out. It becomes active at Gate Card Select Time and falls when Gate Card Select goes away.

While a preferred embodiment of the invention has been illustrated and described, it is to be understood that there is no intention to limit the invention to the precise construction herein disclosed and the right is reserved to all changes and modifications coming within the scope of the invention as defined in the appended claims.

We claim:

1. A shared storage arrangement for a data processing system, comprising:
   a set of a predetermined number of processor units, each of said processor units having facilities for processing data in accordance with programmed instruction sequences and for generating request signals indicative of the need to access shared storage for data transfer operations;
   at least one common shared storage unit, said storage unit storing data processing information in a plurality of addressable locations;
   a storage control unit interconnected with said shared storage unit for controlling access to data in the addressable locations in said shared storage unit;
   individual processor interconnect means respectively associated with each of said processor units and activatable to interconnect said processor unit with said storage control unit;
   access means associated with said storage control unit, said access means being responsive to request signals from said processor units to selectively activate said processor interconnect means and thereby interconnect a selected processor unit through said storage control unit to said shared storage unit for transfer of control, address, and data signals therebetween, said access means being responsive to signals on request lines from said processor units as determined by a predetermined scanning procedure; and
   lookahead analysis means incorporated in said access means for analyzing active request signals from said processor units in accordance with a prioritized arrangement from lowest to highest, said lookahead analysis means incorporating for each of said processor units an individual subset lookahead circuit responsive to request signals from at least one assigned subset of said processor units less in number than said predetermined number, each of said individual lookahead analysis circuits being operable to effectively bypass all inactive request lines and active request lines of lower priority within its assigned subset and to provide a substantially immediate accept signal to activate the processor interconnect means for any requesting processor having highest priority in the subset.

2. The shared storage arrangement of claim 1, further comprising:
individual rack elements for supporting each of said processor units;
an independent rack for supporting said shared storage unit, said storage control unit, said processor interconnect means, said access means, and said lookahead analysis means; and
rack interconnect means for retaining all of said racks in an integrated structure to facilitate grounding of the respective units and cable interconnections.

3. The shared storage arrangement of claim 1, further comprising:
a card file for accommodating individual circuit cards and a power supply, said circuit cards including storage control unit cards, shared storage cards, and processor interconnect cards.

4. The shared storage arrangement of claim 3, further comprising:
processor interconnect means on individual processor interconnect cards for accommodating more than one processor on such individual cards.

5. The shared storage arrangement of claim 1, further comprising:
select ring logic incorporated in said access means, said select ring logic being operable in association with said subset lookahead circuitry for supplying a Go Out signal for the respective processor units when their request signals are accepted.

6. The shared storage arrangement of claim 1, further comprising:
storage means incorporated in said storage control unit for accommodating control, address, and data information and serving as a storage buffer during transfer of such information between a selected processor and said common shared storage unit.

7. The shared storage arrangement of claim 6, further comprising:
address selection means in said storage control unit responsive to address signals from said storage buffer and selection signals to supply address signals for selecting sections of said shared storage unit required during operations.

8. The shared storage arrangement of claim 7, further comprising:
means mounting said shared storage unit in sections on circuit cards, each circuit card accommodating a predefined amount of shared storage information; and
means activating said address selection means in said storage control unit for selecting individual shared storage cards in conjunction with other address signals provided by said storage buffer in said storage control unit.

9. The shared storage arrangement of claim 1, further comprising:
invalid storage address logic incorporated in said storage control unit and responsive to address signals generated during operations to provide an indication when an invalid address is generated.

10. The shared storage arrangement of claim 1, further comprising:
parity check logic in said storage control unit for checking the parity conditions of information transferred between a selected processor unit and said common shared storage unit.

11. The shared storage arrangement of claim 1, further comprising:
test and set means associated with each of said processor units and activated when a processor unit has had its request accepted to inhibit further advancement of said access means and thereby prevent access by another processor unit for a time period long enough to complete the servicing of the currently accepted processor unit.

12. The shared storage arrangement of claim 1, further comprising:
select ring logic incorporated in said access means;
first control means for operating said select ring logic in a counter-clockwise direction to fulfill service requests by said processor units when they occur independently and in a timed sequence; and
second control means for operating said lookahead analysis means in a counter-clockwise direction when two or more processor units submit request signals concurrently.

13. The shared storage arrangement of claim 1, further comprising:
input gating means in said access means responsive to request signals to individual processor units to supply said signals in accordance with a prioritized arrangement; and
a master request circuit responsive to a request signal on any processor input line, said master request circuit providing a signal to inhibit said lookahead analysis means for a predetermined amount of time allowing said lookahead analysis means to receive all of its inputted request signals and to settle down prior to supplying an accept signal.

14. The shared storage arrangement of claim 13, further comprising:
a processor accept latch in said access means for each of said processor units, said processor accept latch providing an accept signal to its related processor unit when its request has been accepted by said lookahead analysis means; and
a single shot circuit, said single shot circuit being responsive to a signal from said master request latch to inhibit setting of any of said processor accept latches until after a predetermined interval to allow sufficient time for said lookahead analysis circuit to determine priority and to settle down.

* * * * *